United States Patent
Erdley et al.

[15] 3,678,764
[45] July 25, 1972

[54] GYROSCOPE HAVING VIBRATING GIMBALS

[72] Inventors: Harold F. Erdley; Stanley F. Wyse, both of Los Angeles, Calif.

[73] Assignee: Litton Systems, Inc., Beverly Hills, Calif.

[22] Filed: Nov. 20, 1967

[21] Appl. No.: 684,270

[52] U.S. Cl............................................74/5, 74/5.6
[51] Int. Cl.....................................................G01c 19/22
[58] Field of Search.................74/5, 5.5, 5.6; 308/2, 2 A

[56] References Cited

UNITED STATES PATENTS

| | | |
|---|---|---|
| 3,354,726 | 11/1967 | Krupick et al.............................74/5 |
| 3,538,776 | 11/1970 | Macor et al...............................74/5 |
| 3,543,301 | 11/1970 | Barnett....................................74/5 |
| 1,801,619 | 4/1931 | Arrea........................................74/5 |
| 3,515,006 | 6/1970 | Duck..........................................74/5 |
| 3,211,011 | 10/1965 | Litty..........................................74/5 |
| 3,367,194 | 2/1968 | Diamantides..............................74/5.6 |
| 3,382,726 | 5/1968 | Erdley......................................74/5.6 |

*Primary Examiner*—Manuel A. Antonakas
*Attorney*—Alan C. Rose, Alfred B. Levine, Harold L. Gillman and Thomas A. Seeman

[57] ABSTRACT

A gyroscope in which the rotor is supported with respect to its driving shaft by a plurality of intermediate gimbals in which each intermediate gimbal is torsionally attached to the rotor and to the driving shaft, the attachments being positioned, the spring constants being adjusted, and the moments of inertia of the gimbals being adjusted to allow the rotor to be a free rotor while eliminating rectification torques, caused by oscillatory inputs on the shaft, from the rotor.

46 Claims, 31 Drawing Figures

Patented July 25, 1972

INVENTORS
HAROLD F. ERDLEY
STANLEY F. WYSE
BY
Ernest L. Brown
ATTORNEY

Patented July 25, 1972

INVENTORS
HAROLD F. ERDLEY
STANLEY F. WYSE
BY
Ernest L. Brown
ATTORNEY

Patented July 25, 1972

$\psi = \psi_0 + 0$ DEGREES

HAROLD F. ERDLEY
STANLEY F. WYSE
INVENTORS

BY
Ernest L. Brown
ATTORNEY

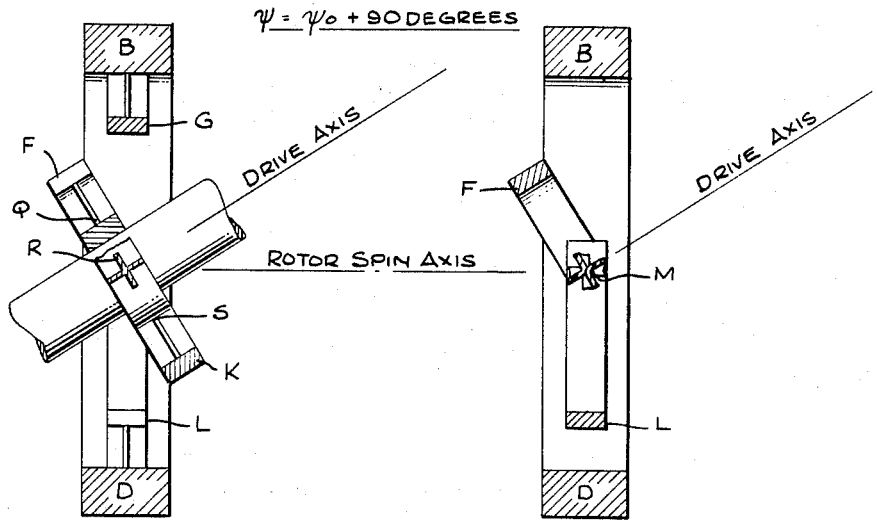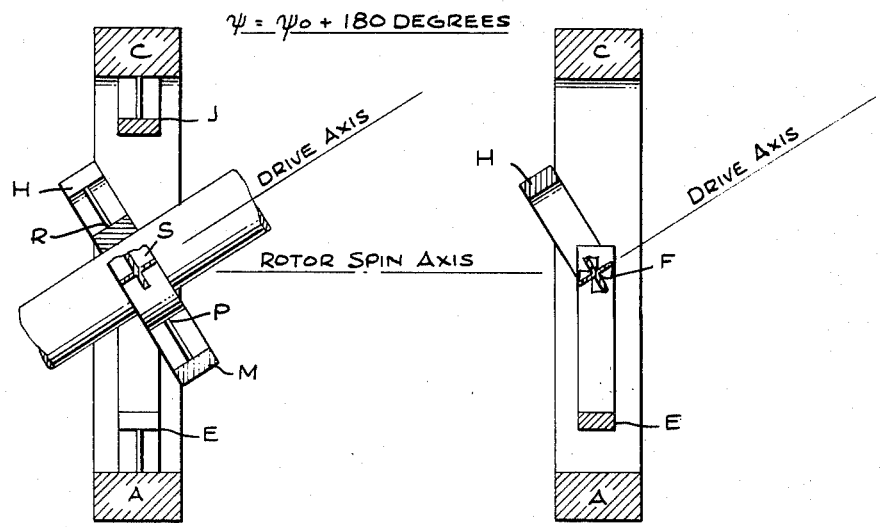

Patented July 25, 1972

HAROLD F. ERDLEY
STANLEY F. WYSE
INVENTORS

Ernest L. Brown
ATTORNEY

Patented July 25, 1972

HAROLD F. ERDLEY
STANLEY F. WYSE
INVENTORS

BY
Ernest L. Brown
ATTORNEY

Patented July 25, 1972 3,678,764

HAROLD F. ERDLEY
STANLEY F. WYSE
INVENTORS

BY
Ernest L. Brown
ATTORNEY

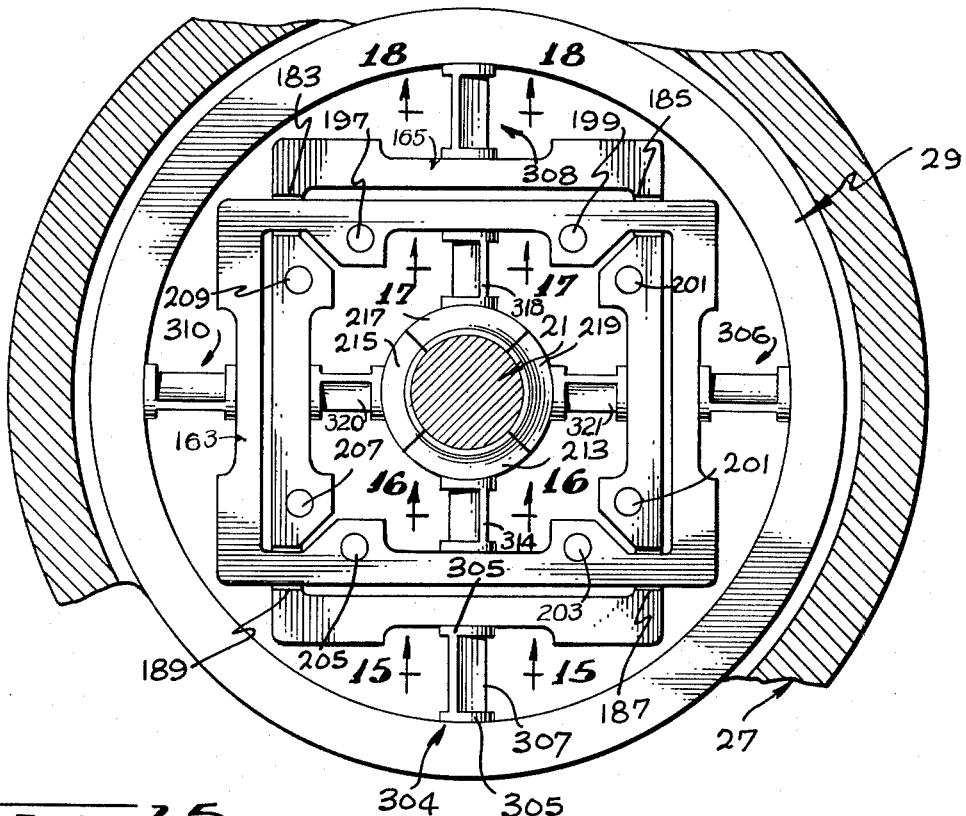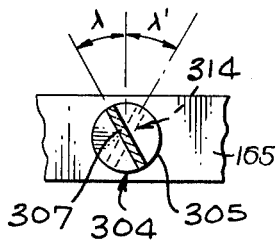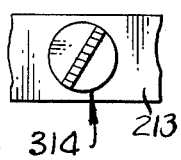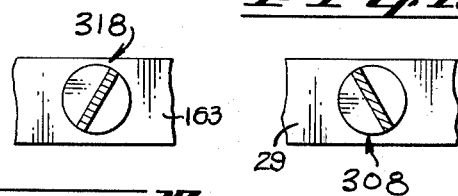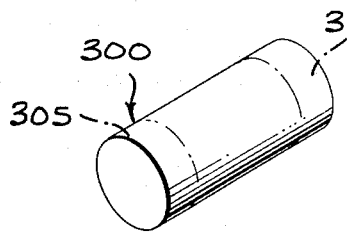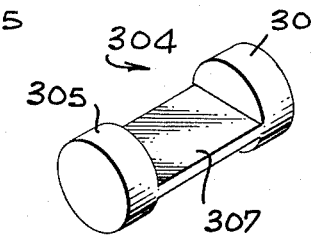
HAROLD F. ERDLEY
STANLEY F. WYSE
INVENTORS
BY
Ernest L. Brown
ATTORNEY

GYROSCOPE HAVING VIBRATING GIMBALS

A free gyroscope has a spinning rotor which is mounted relative to a supporting structure so that the supporting structure can be turned or translated without applying disturbing torques to the rotor. Consequently, the spin axis of the rotor remains constant relative to the fixed stars. In a practical device, however, control torques are applied to the rotor to cause the rotor to precess in a controlled manner. A free gyroscope customarily has angular sensing devices between the supporting member and the rotating rotor or between the driving shaft and the rotating rotor to detect angular misalignment between the rotor spin axis and either the shaft or a housing-fixed axis. The angular misalignment, so detected, may then be used, with suitable amplifiers, to apply torque to the free rotor to cause the free rotor substantially to follow the supporting structure.

One of the ways a free gyroscope rotor is maintained free is to support it on a gas bearing, whereby no torques, other than predetermined applied torques, are applied to the free rotor.

Another free rotor gyroscope which is of interest is a "Dynamically Tuned Free Rotor Gyroscope" described in "Control Engineering," June 1964 issue, between p. 67 and 72. The dynamically tuned free rotor gyroscope described in that article uses a single intermediate gimbal attached by a configuration to support the rotor upon a drive shaft which, from time to time, becomes misaligned with the spin axis of the rotor. The intermediate gimbal, under conditions of misalignment between the spin axis of its drive shaft and the spin axis of its rotor has a vibratory-like motion, which is described in the Figures appearing particularly on p. 69 of the article.

Unfortunately, a device such as that described in the "Control Engineering" article is sensitive not only to angular displacement between the drive shaft and the rotor, caused by the inputs to be measured, but also is sensitive to angular oscillations (caused by bearing noise, and the like) at a frequency which is twice the frequency of rotation of the shaft and the rotor. Because bearing noise frequently has a high second harmonic content, the most disturbing component of vibration is that which occurs at twice the angular frequency of the driving shaft and the rotor. The effect of the application of such disturbances to the drive shaft or housing at twice the rotation frequency is to apply a constant or rectified torque to the rotor causing a precession of the rotor which appears to be produced by a constant angular rate of the housing.

The gyroscope of this invention is a tuned free rotor gyroscope, having vibrating intermediate gimbals, which reduces to a negligible value the effect of input angular oscillation at twice the angular drive frequency. To achieve the reduction of the effects caused by angular oscillation, while still obtaining a free rotor characteristic, the device of this invention uses at least two intermediate gimbals which are torsionally attached to the driving shaft and to the rotor in positions to cancel the steady effects (called 2N rectification effects) of the application of oscillatory inputs to the gyroscope. In a preferred embodiment, the intermediate gimbals are attached to the rotor by springs whose axes are at right angles to each other and to the drive shaft by springs whose axes are also at right angles to each other. On each individual gimbal of the preferred embodiment, the spring attached between the gimbal and the rotor has a torsion axis which is preferably at a right angle to the axis of the spring which is connected between that gimbal and the driving shaft. The moments of inertia and the spring constants of the springs are adjusted, in a preferred embodiment of the invention, to provide the rotor with a free gyroscope characteristic while simultaneously eliminating the effects of angular oscillatory inputs (displacements, angular velocity and torque) at twice the frequency of rotation of the driving shaft and the rotor.

In a most preferred embodiment of the invention, the intermediate gimbals are completely closed members which may be overlapping, and the torsion spring attachments are leaf springs. The leaf springs are easily manufactured from a dowel by milling out the leaf spring from the central portion of the length of the dowel. The leaf springs may then be attached to the gimbals and rotor, e.g. by brazing. When the leaf springs are attached to the gimbals and rotor, in the absence of any torsional deflection of the spring, in this preferred embodiment, the torsion axes of four springs will be in line, two connected to the rotor and two to the driving shaft. To make the structure isoelastic, the medial planes of the leaf springs attached to the driving shaft form an acute angle with the medial planes of the leaf springs attached to the rotor, and a plane defined by the in-line torsion axes and the axis of rotation of the driving shaft and rotor bisects that acute angle.

An isoelastic structure is one which is insensitive to accelerations. The line of deflection of the structure, in response to acceleration, passes through the center of support, thus applying no torque to the structure. It is sometimes desireable, however, to make the rotor of the gyroscope pendulous, thereby to make it sensitive, in a predetermined fashion, to a particular component of acceleration. Such a pendulous gyroscope is sensitive to both angular rates and linear acceleration. To separate the effects of acceleration and angular rate, two gyroscopes, one pendulous and one not pendulous, preferably with the axis of their driving shafts co-linear, are used. Both gyroscopes, if desired, may be driven from the same shaft and motor, and be enclosed in the same housing. The non-pendulous gyroscope measures angular rate only. The pendulous gyroscope measures both angular rate and linear acceleration. The sensed signal from the non-pendulous gyroscope may be combined with the sensed signal from the pendulous gyroscope to obtain a signal which is a measure of acceleration.

It is therefore an object of this invention to support the rotor of a free rotor gyroscope relative to its driving shaft in a fashion to eliminate the rectification effects of oscillatory angular inputs.

It is another object of this invention to provide apparatus for achieving the above-enumerated objects in which the apparatus has at least two intermediate gimbals each connected between the driving member and the driven member.

It is also a specific object of this invention to provide a free rotor gyroscope having multiple intermediate gimbals, adapted to eliminate 2N rectification effects from the rotor, and isoelasticity to eliminate the unwanted effects of applied acceleration.

It is a specific object of the invention to provide a free gyroscope as described in the next above object in which the intermediate gimbals are supported by leaf springs which have their medial planes angularly disposed to enhance the isoelastic properties of said gyroscope.

It is also an object of this invention to provide a torsion leaf spring which is made from a dowel, and the method of making said spring.

Another object of this invention is to measure acceleration using the novel gyroscope of this invention in a configuration in which the rotor is pendulous.

It is still another object of this invention to drive two rotors of two gyroscopes, in the fashion described above, by a single driving shaft.

Other objects will become apparent from the following description, taken in connection with the accompanying drawings in which.

Figure 6:
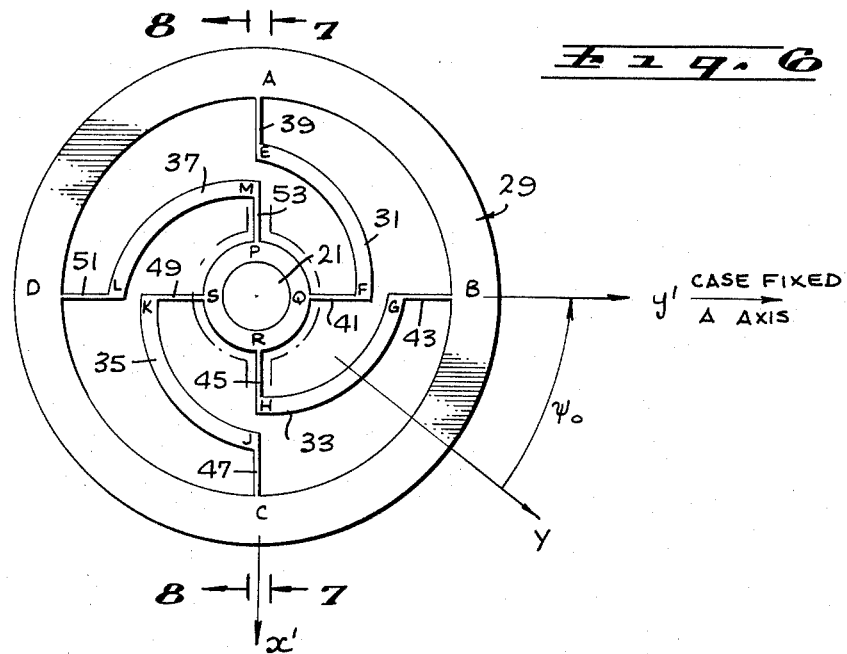
FIG. 6 is a diagrammic view of a typical device similar to that of FIGS. 1 through 5, which is simplified for purposes of explaining the operation of the device.
Figures 7A, 8A:
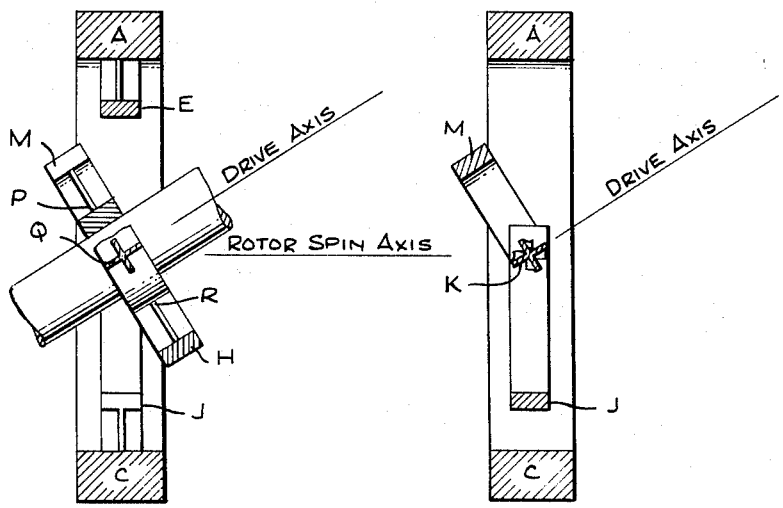
Figure 21:
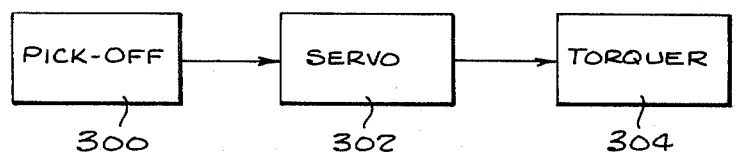
Figure 9:
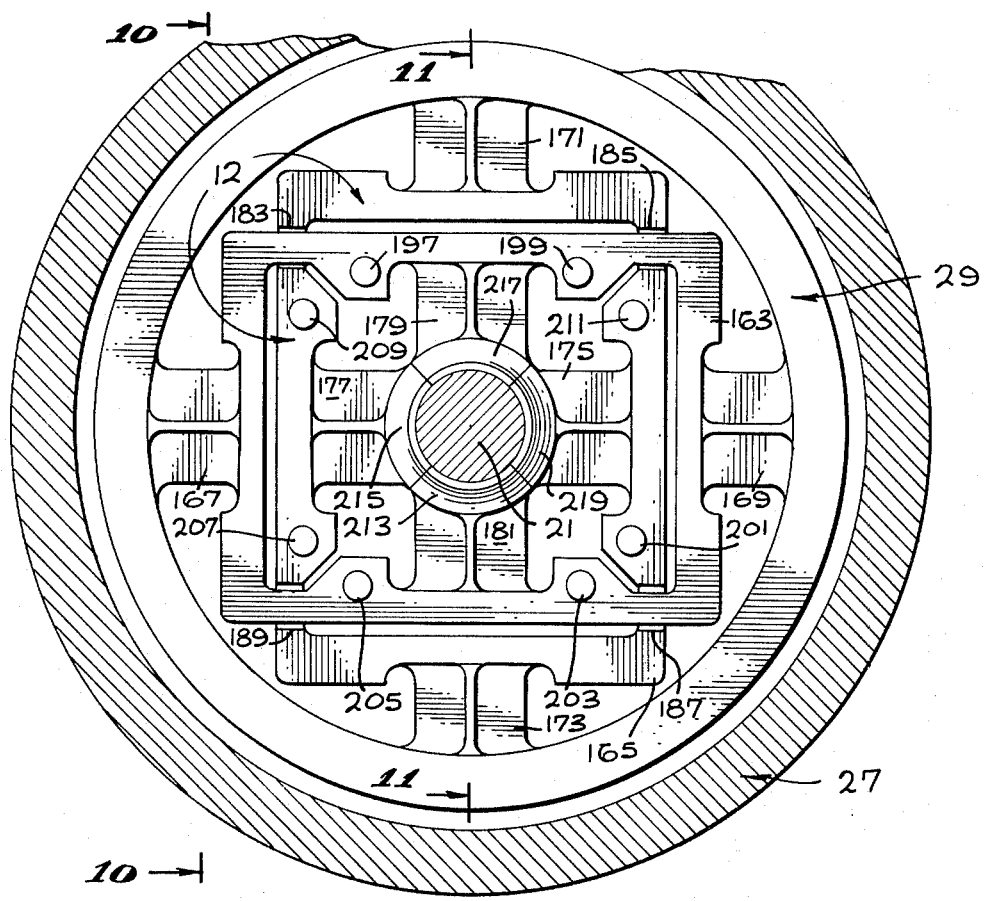
Figure 12:
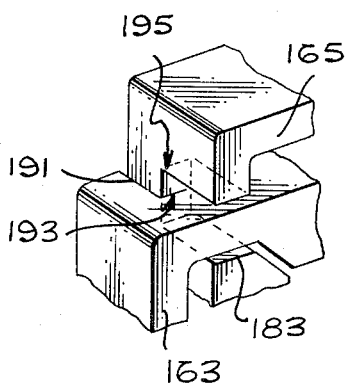
Figure 10:
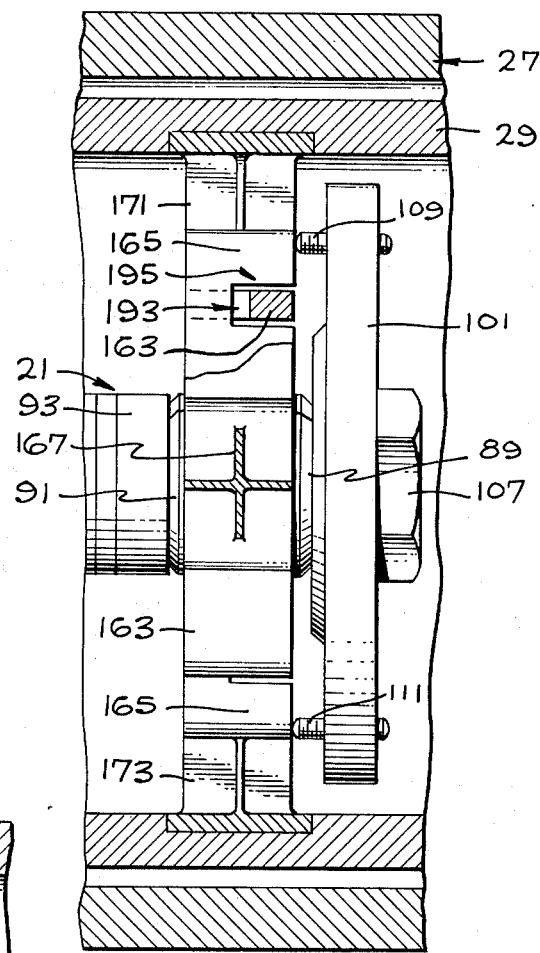
Figure 11:
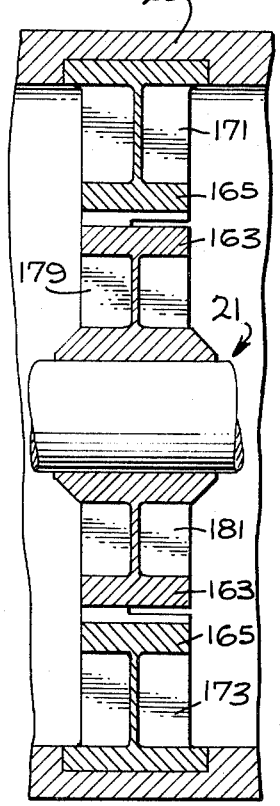
Figure 13A:
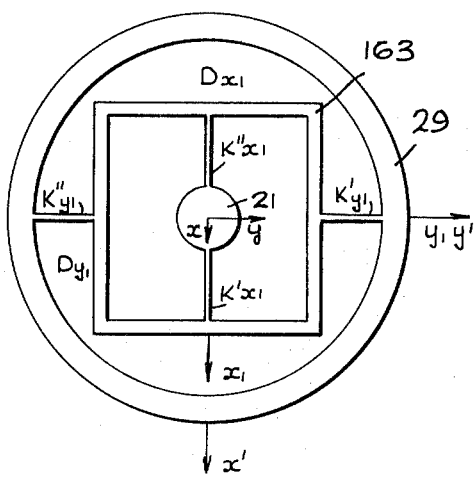

FIGS. 7a, b, c and d are sectional views, taken at the case fixed section line 7—7 in FIG. 6, showing the relative displacement between the various gimbals, the driving shaft, and the rotor at positions of the rotation of the rotor taken 90° apart;

FIGS. 8a, b, c and d are sectional views similar to FIGS 7a, b, c and d, taken at the case fixed section line 8—8 in FIG. 6;

FIG. 9 is a profile view, partly in section, of a second embodiment of the rotor portion of the device of this invention;

FIG. 10 is a view, partly in section, taken at 10—10 in FIG. 9;

FIG. 11 is a view, partly in section, taken at 11—11 in FIG. 9;

FIG. 12 is an oblique fragmentary profile view of the two gimbals taken at 12—12 in FIG. 9;

FIGS. 13a, b, c and d are diagrams used in describing the theory of the invention;

FIG. 14 is a modification of the second embodiment of the rotor portion of the device of this invention, using leaf torsion springs in place of the cruciform springs of FIG. 9;

FIG. 15 is a view, partly in section, taken at 15—15 in FIG. 14;

FIG. 16 is a view, partly in section, taken at 16—16 in FIG. 14;

FIG. 17 is a view, partly in section, taken at 17—17 in FIG. 14;

FIG. 18 is a view, partly in section, taken at 18—18 in FIG. 14;

FIG. 19 is a piece of dowel stock showing cuts to be made to form the leaf spring used in FIG. 14;

FIG. 20 is an enlarged view of a typical leaf torsion spring used in the embodiment of FIG. 14; and FIG. 21 is a block diagram of a servo system between the pickoff and torquer of the gyroscope.

Figure 1:
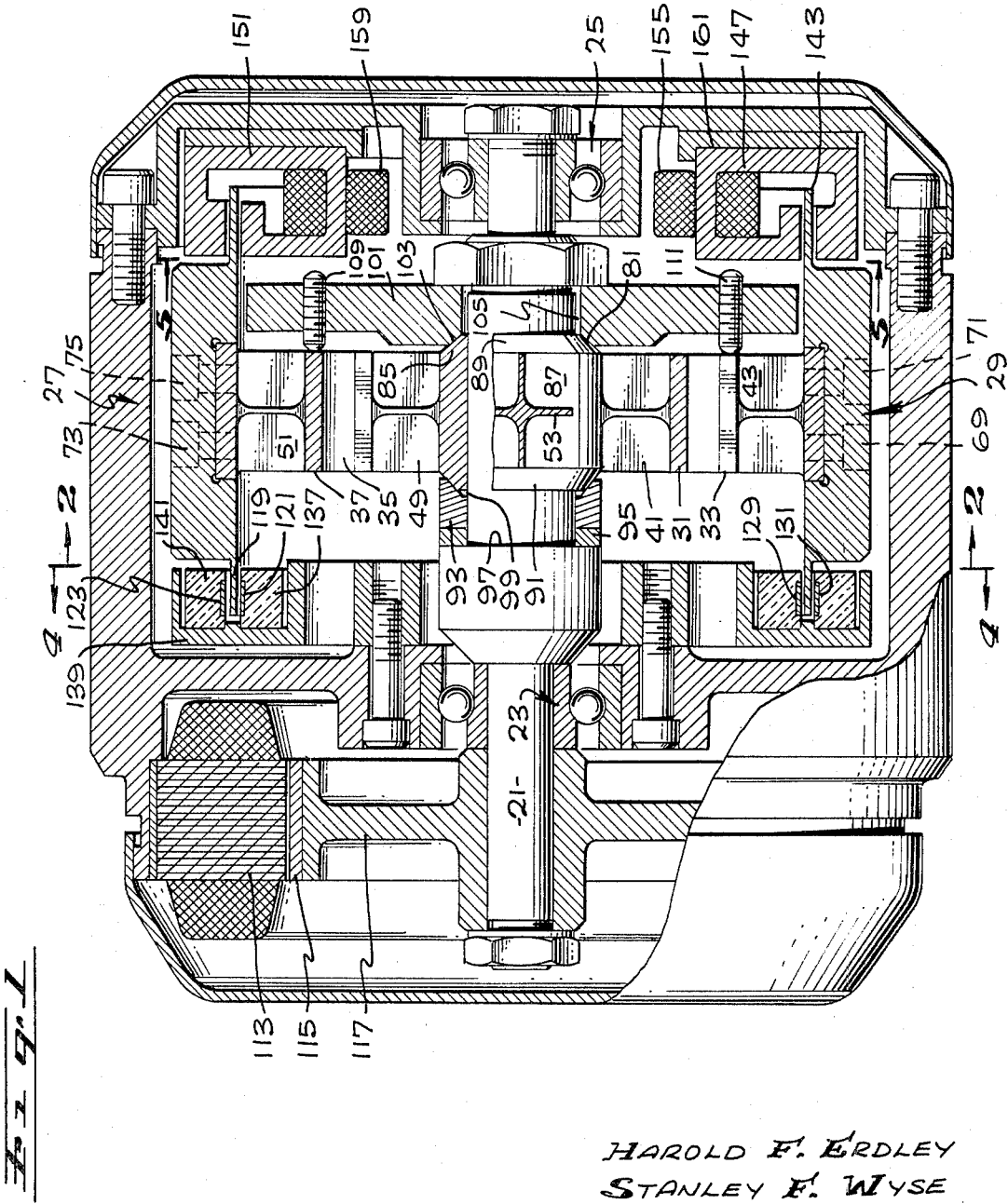
FIG. 1 is a cutaway view, partly in section, of a first embodiment of the device of this invention.
Figure 2:
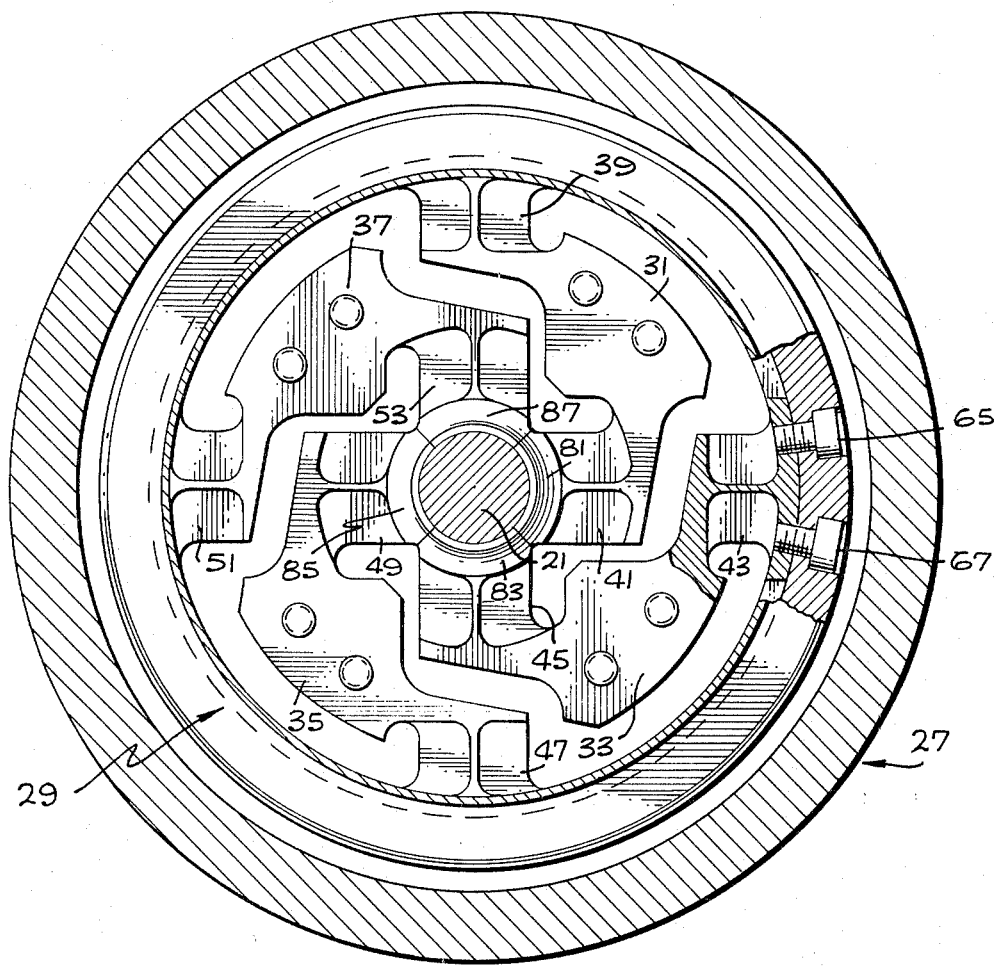
FIG. 2 is a view, partly in section, taken at 2—2 in FIG. 1.
Figure 3:
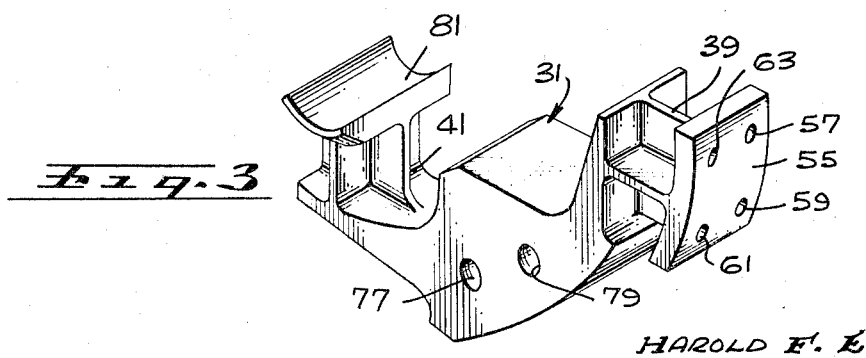
FIG. 3 is an oblique view of a typical intermediate gimbal used in the device of FIGS. 1 and 2.

In FIGS. 1 through 5 is shown a first embodiment of the device of this invention. A shaft 21 is supported by bearings 23 and 25, which are shown as pre-loaded ball bearing sets, relative to the housing 27. The rotor 29 is supported through two intermediate gimbal means, each comprising two gimbals, by the shaft 21. A first gimbal means comprises gimbals 31 and 35. A second gimbal means comprises gimbals 33 and 37. Each pair of gimbals forming a single gimbal means may be considered as if it were a single gimbal because the two gimbals operate in synchronism and no change would occur if they were mechanically connected together. Each of the gimbals 31, 33, 35 and 37 supports a pair of torsion springs, one connected to the rotor 29 and the other connected to the shaft 21. The axes of torsion of the two torsion springs on each gimbal are at right angles. The gimbal 31 is connected by torsion spring 39 to the rotor 29 and by torsion springs 41 to the shaft 21; the gimbal 33 is connected by torsion spring 43 to the rotor 29 and by torsion spring 45 to the shaft 21; the gimbal 35 is attached by torsion spring 47 to the rotor 29 by torsion spring 51 to the rotor 29 and by torsion spring 53 to the shaft 21. The torsion axes of springs 39, 41; 43, 45; 47, 49; and 51, 53 are preferably substantially orthogonal. The torsion axes of springs 45, 53 are substantially orthogonal to those of springs 41, 49; and those of springs 43, 51 to those of springs 39, 47. The gimbals 31, 33, 35 and 37 are substantially identical; hence only one is described in detail. The torsion spring 39 is attached to the center of rotor 29 through a bracket 55 which has four screw holes 57, 59, 61 and 63 which are adapted to receive screws which are similar to the screws, shown in FIGS. 1 and 2, at 65, 67, 69, 71, 73 and 76. The holes 77 and 79 are adapted to receive balance weight screws (not shown) to adjust the amounts of inertia of the gimbal 31. The spring 41 has an end piece 81 which is contoured to contact the surface of the shaft 21. The arc distance across the member 81 is one-quarter of the circumference of the shaft 21. The remaining three-quarters of the circumferences are enclosed by the end members 83, 85 and 87 of the springs 45, 49 and 53, as shown more particularly in FIG. 2. The two ends of the members 81, 83, 85 and 87 are tapered, as shown in FIG. 1 at 89 and 91. A conically shaped receiving member 93 with a back-up washer 95 is positioned against the shoulder 97 on the shaft 21 and is adapted to receive the conical ends at 91. The conical ends 91 are wedged into the conical receiving end of member 93, as shown by the clearance at 99. A bearing plate 101, having a conical engaging surface 103, and clearance at 105 to tilt on the shaft 21, engages the end 89 of the members 81, 83, 85 and 87. A screw member 107 on the shaft 21 forces the tiltable bearing plate 101 to engage with the members 81, 83, 85 and 87, thereby wedging them into engagement with the members 93 and equalizing the engaging force which holds the members 81, 83, 85 and 87 in place. The bearing plate 101 also supports four stop members, two of which are shown at 109 and 111.

A plurality of motor stator windings, one of which is shown at 113, electromagnetically engage the hysteresis ring 115 upon a web 117 which is attached to the shaft 21, thereby to drive the shaft 21 at a synchronous speed whose angular velicity is designated "$N$."

Figure 4:
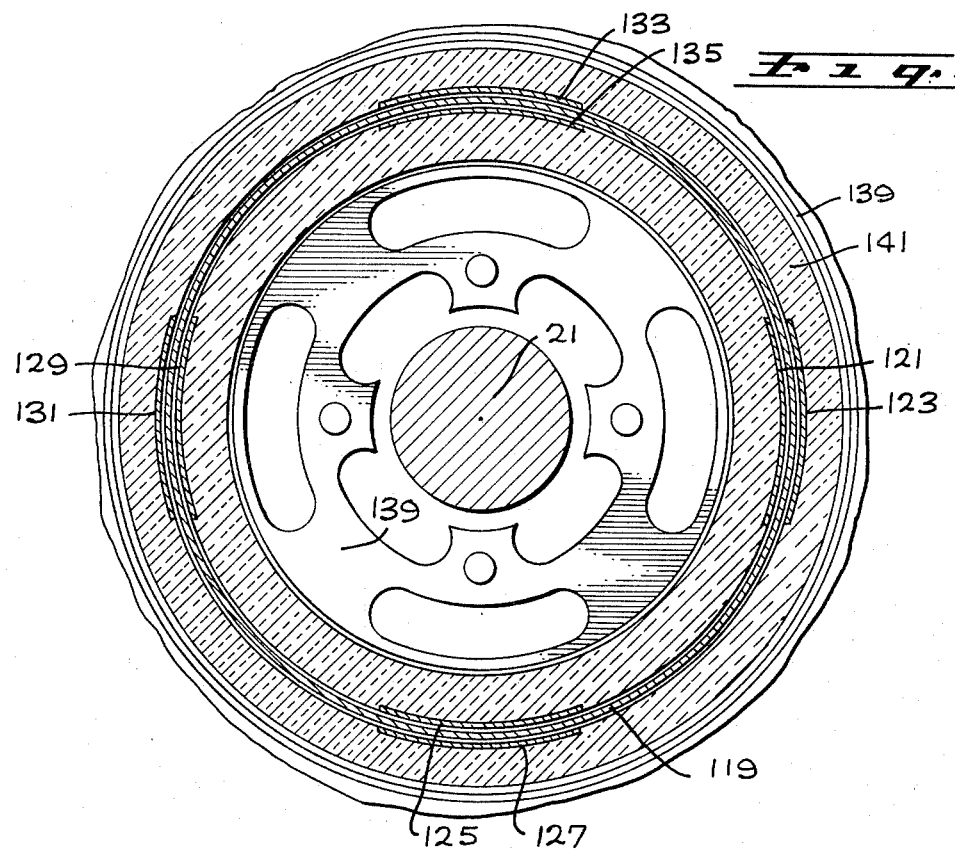
FIG. 4 is a view, partly in section, taken at 4—4 in FIG. 1.

Relative deflection between the housing 27 and the axis of spin of rotor 29 is detected by capacitance pickoffs which are shown particularly in FIGS. 1 and 4. The rotor 29 has a conductive flange 119 on one side thereof extending completely around the rotor, as shown particularly in FIG. 4. Eight capacitor plates, forming four capacitor pairs are uniformly circumferentially positioned about the axis of flange 119, as shown at 121, 123, 125, 127, 129, 131, 133, 135. Plates 121, 123, 129, 131 are connected into a bridge circuit (not shown) to detect displacement of the flange 119, and hence the rotor 29, relative to the capacitor plates. The measured displacement is then a measure of the angular relation between the housing 27 and the axis of spin of the rotor 29, about an axis (not shown) which passes through the center of electrodes 125, 127, 133, 135 of FIG. 4. Similarly electrodes 133, 135, 125 and 127 are connected into a bridge circuit (not shown) to detect the angular displacement between the axis of spin of the shaft 21 and the axis of spin of the rotor 29 about an axis (not shown) passing through the center of the electrodes 131, 129, 121, 123. The capacitor electrodes 121, 125, 129 and 135 are mounted upon—for example—a ceramic ring 137 which is attached to a bracket 139 of the housing 27. The capacitor electrodes 123, 127, 131 and 133 are attached to a second dielectric ring made—for example—of quartz or fused silica 141 and which is also attached to bracket 139.

Figure 5:
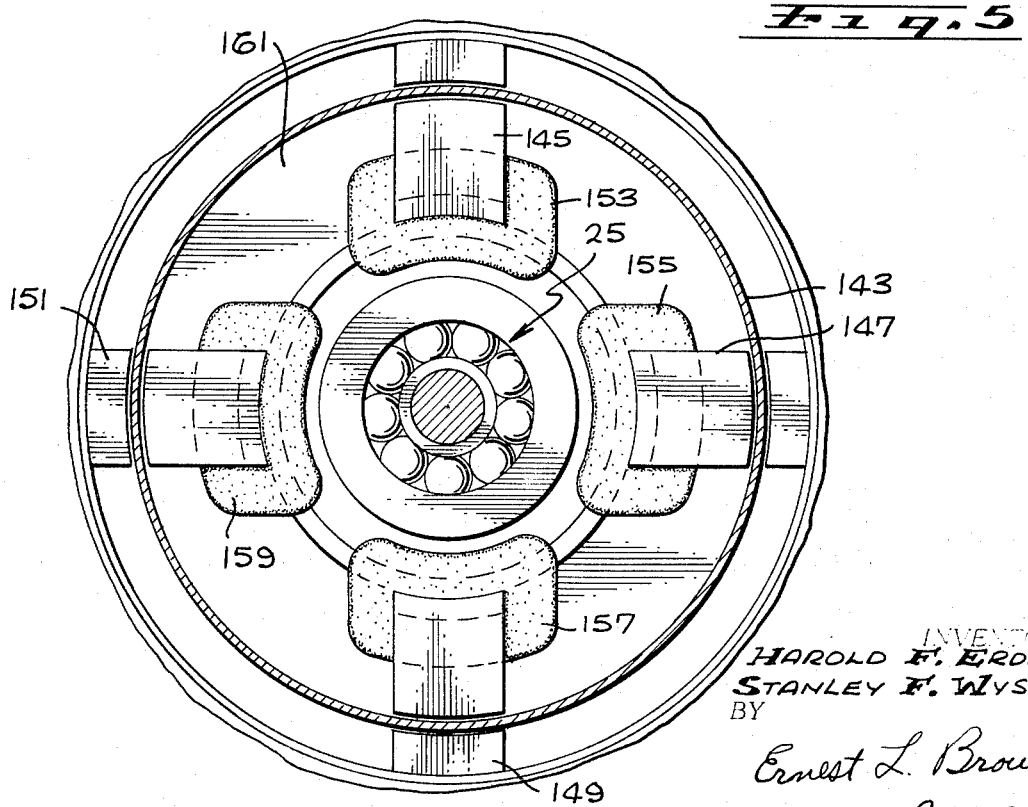
FIG. 5 is a view, partly in section, taken at 5—5 in FIG. 1.

A means for applying eddy current torque to the rotor 29 is shown in FIGS. 1 and 5. A conductive flange 143 is positioned around the rotor 29 upon the end of the rotor opposite the conductive flange 119. The flange 143 fits into the gaps of four circumferentially symmetrically disposed electromagnets 145, 147, 149 and 151. Each of the electromagnets has an electric coil which is connected to be controlled by —for example—control means such as computers or servo means, shown in FIG. 21. The coils driving the electromagnets are shown at 153, 155, 157 and 159. The electromagnets 145, 147, 149 and 151 are supported upon a bracket 161 attached to the housing 27. When it is desired to apply a torque to rotor flange 143 about an axis (not shown) passing through the magnets 145 and 149, magnets 145 and 149 are selectively energized. The eddy currents induced in the flange 143 react with the flux field to produce this torque. When it is desired to apply a torque to flange 143 about an axis (not shown) passing through the center of magnets 147 and 151, magnets 147 and 151 are selectively energized.

A second embodiment of the invention is shown in FIGS. 9, 10, 11 and 12. The embodiment of FIGS. 9, 10, 11 and 12 uses two overlying intermediate gimbals 163 and 165, (corresponding to each gimbal means of two gimbals of FIG. 1) each of which is attached by two diametrically opposed torsion springs 167, 169 and 171, 173 to the rotor 29, and each of which is attached by diametrically opposed torsion springs 175, 177 and 179, 181 to the shaft 21. On each of the gimbals 163 and 165, the axis of the springs which attach that particular gimbal to the shaft 21 is preferably at right angles to the axis of the springs which attach that particular gimbal to the rotor 29. The plane of the axes of the torsion spring 167, 169, 171, 173, 175, 177, 179, 181 under conditions of no misalignment between the shaft 21, and the rotor 29, are preferably substantially co-planar. To make the aforementioned axes co-planar, clearance needs to be provided between the gimbals 163 and 165 to avoid interference. The clearance provided on gimbal 165 to allow gimbal 163 freedom for independent motion is shown at 183, 185, 187 and 189. Corresponding clearance is provided on gimbal 163 for freedom of motion of gimbal 165, as shown more particularly at 191 in FIG. 12. It will be noted that the clearance occurs because of the overlying notches in gimbals 163 and 165, designated by the arrows 193 and 195. Screw holes are shown in the gimbals 163 and 165 at 197, 199, 201, 203, 205, 207, 209 and 211 to accommodate balance weights which are used to adjust the moments of inertia of the gimbals 163 and 165. For simplicity, the balance weight screws are not shown. The springs 175, 177, 179 and 181 each terminate in a connection with the embodiment of FIG. 1. These sector segments are shown at 213, 215, 217 and 219.

The embodiment of FIGS. 14 through 20 is identical to the embodiment of FIGS. 9 through 12 except that a different torsion spring is used. The torsion spring used in the embodiment of FIGS. 14 through 20 is a flat leaf spring which has the desired torsion spring constant. The leaf springs are shown at 304, 306, 308, 310, 314, 318, 320 and 321. In their undeflected position, the medial planes of the springs on each of the axes perpendicular to the "z" axes are angularly oppositely displaced from a plane defined by the "z" axis and the torsion axes of the springs, through equal angles $\lambda$, $\lambda'$ shown in FIG. 15. That is, the acute angle between the medial planes of the pairs of springs on each undeflected torsion axis is bisected by the above-mentioned plane. The bisected acute angle is preferably on the order of 84°, i.e. $\lambda = \lambda' = 42°$. Note for example, that the medial planes of the springs 304 and 308 are the same, $\lambda$, direction while the medial planes of the springs 314 and 318 are oriented in the other direction, $\lambda'$, from that of springs 304, 308. Similarly, springs 306 and 310 are oriented in one direction while springs 320 and 321 are oriented in the other direction. The opposing orientation of the medial planes of the leaf springs causes the rotor 29 to be isoelastic, hence insensitive to accelerations. This may be seen when one considers that each of the leaf springs is relatively rigid in bending in one direction while it is weak in bending in the other direction. Thus, for example, an acceleration applied in a particular direction might tend to bend springs 307 and 308. However, the bending load would be taken by springs 314 and 318. The rotor 29 would be at least as insensitive to side acceleration in the embodiment of FIG. 14 as it would be in the embodiment of FIG. 9 which uses cruciform torsion springs.

Cruciform torsion springs would be more difficult to manufacture than the springs of FIG. 14 through 20. In manufacturing the flat spring a piece of dowel stock 300, as shown in FIG. 19, can easily be milled into the torsion spring of FIG. 20 by clamping it into a milling machine, milling off one side, turning the dowel over, then milling off the other side. The springs may then be brazed at their attaching ends 305 to the rotor 29, the gimbals 163 and 165, and to the shaft attaching elements 213, 215, 217 and 219.

It should be noted that although the spring 307, and the other springs, are shown relatively thick for illustration purposes that the actual thickness depends upon the desired spring constant.

The gyroscope has been described wherein the rotor is insensitive to acceleration. The rotor may be made sensitive to acceleration, if desired, by making it pendulous, i.e. by displacing its center of mass to one side of its plane of attachment. The resulting gyroscope then measures both angular inputs and lineal acceleration.

By driving two gyroscopes one pendulous and one non-pendulous with the same driving shaft, one may separate out the signal which is a measure of acceleration. The non-pendulous gyroscope measures only angular input signals. The pendulous gyroscope measures both angular inputs and lineal acceleration. The signal measuring only angular inputs may be subtracted from the combined signal to produce signals which are a measure of acceleration.

FIG. 6 is an idealized picture of the rotor 29 and the shaft 21 of FIGS. 1 through 5, together with a schematic diagram of the intermediate gimbals and springs. The rotor 29 is shown positioned at some initial angle $\psi_o$ with respect to case-fixed coordinates. Various points upon the rotor 29, the shaft 21 and the gimbals 31, 33, 35 and 37, are designated with the letters A, B, C, D, E, F, G, H, J, K, L, M, P, O, R and S. The last mentioned letter designations are useful in connection with FIGS. 7a, b, c, d and 8a, b, c, d to explain the kinematics of the gimbals, the shaft, and the rotor under conditions of misalignment between the drive axis of the shaft 21 and the spin axis of the rotor.

FIGS. 7a, b, c and d are taken at case-fixed section lines 7—7 in FIG. 6 under conditions of $\psi = \psi_o + 0°$, $\psi = \psi_o + 90°$, $\psi = \psi_o + 180°$ and $\psi = \psi_o + 270°$. FIGS. 8a, b, c and d correspond to sections taken at case-fixed section line 8—8 in FIG. 6 under conditions identical to the corresponding figures of FIG. 7. FIGS. 7 and 8 will be important in explaining the operation of the device of the invention. It should be noted that the FIGS. 7a, b, c, d are structurally the same, merely reflecting 90° increments of $\psi$ between FIGS. 7a and 7b, between 7b and 7c, and between 7c and 7d, as shown by the permutations of identifying letters. Similarly, the FIGS. 8 a, b, c, d are structurally the same, and correspond to the positions of the gimbals and rotors under 90° increments of $\psi$. More specifically, FIGS. 7a and 8a are taken when $\psi = \psi_o$, i.e. in the configuration shown in FIG. 6; with the drive axis misaligned from the rotor spin axis, about the case-fixed "A" axis.

FIGS. 7b and 8b show the positions of the gimbals relative to the shaft and rotor after the angle $\psi$ has advanced 90° counter clockwise from the position shown in FIGS. 7a and 7b, i.e. in which $\psi = \psi_o + 90°$.

FIGS. 7c and 8c show the positions of the gimbals relative to the rotor and shaft after the angle $\psi$ has advanced an additional 90° counter clockwise from the position of FIGS. 7b and 8b, i.e. $\psi = \psi_o + 180°$.

Figures 7D, 8D:
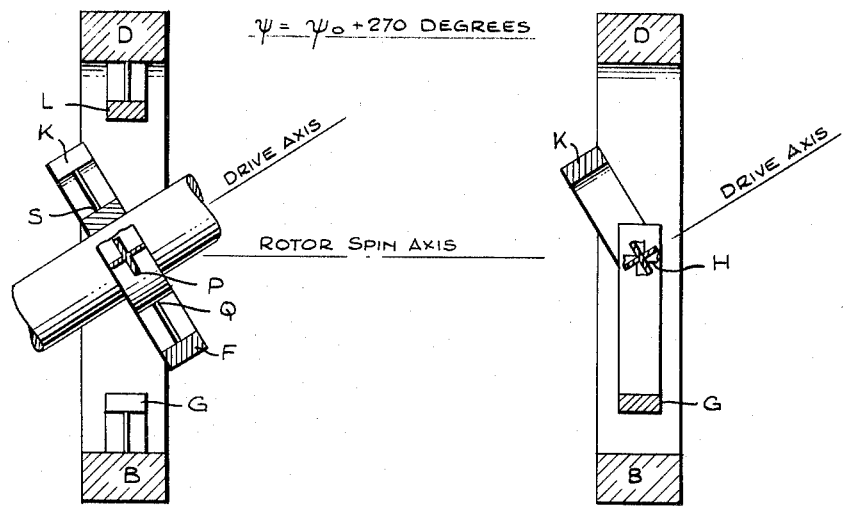

FIGS. 7d and 8d show the positions of the gimbals relative to the rotor and shaft after the angle $\psi$ has advanced an additional 90° from the position shown in FIGS. 7c and 8c, i.e. $\psi = \psi_o + 270°$.

Referring to FIGS. 7a and 8a, a relative displacement of the drive axis (and hence the case of the instrument) about the "A" axis causes the springs 51, 49, 41 and 43 to deflect in torsion while the springs 39, 53, 45 and 47 remain torsionally undeflected. Consequently, gimbals 31 and 35 instantaneously are moving with the rotor 29 while the gimbals 33 and 37 are instantaneously moving with the shaft 21.

After the angle $\psi$ has increased in a counter clockwise direction, (see FIG. 6) the rotor has moved into the position shown in FIGS. 7b and 8b. Because of the symmetry of the rotor, gimbals and shaft, FIGS. 7b and 8b appear identical in structure to FIGS. 7a and 7b. However, it should be noted that the designation of the letters on the figure, that one actually is looking at a different part of the rotor, e.g. "B" has replaced "A," "G" has replaced "E," "F" has replaced "M," "Q" has replaced "P," "R" has replaced "Q," "S" has replaced "R," "K" has replaced "H," "L" has replaced "J," "E" has replaced "L," and "M" has replaced "K." In the position of FIGS. 7b and 8b, springs 39, 53, 45 and 47 deflect in torsion while springs 51, 49, 41 and 43 remain torsionally undeflected, whereby gimbals 33 and 37 are instantaneously moving with rotor 29 and gimbals 31 and 35 are instantaneously moving with drive shaft 21. In an intermediate position between that of FIGS. 7a, 8a and FIGS. 7b and 8b, the various gimbals would be in transition. Thus, the various gimbals (assuming that the rotor 29 is dynamically a free rotor) would appear to oscillate during misalignment between the drive axis and the rotor spin axis.

In FIGS. 7c and 8c, the angle $\psi$ has advanced an additional 90°. Similarly, in FIGS. 7d, 8d, the angle $\psi$ has advanced an additional 90° from that of FIGS. 7c and 8c.

During misalignment between the drive axis and the rotor spin axis, it should be noted that in every position of the shaft and rotor, i.e., every value of $\psi$, gimbals 31 and 35, forming a first gimbal means, behave kinematically as if they were rigidly connected to each other. Similarly, gimbals 33 and 37, forming a second gimbal means, behave kinematically as if they were rigidly connected to each other.

The following paragraphs describe the equations of motion of the gyroscope, the tuning conditions, and the conditions for substantial suppression of errors caused by applied torques at frequency 2N.

Figure 13B:
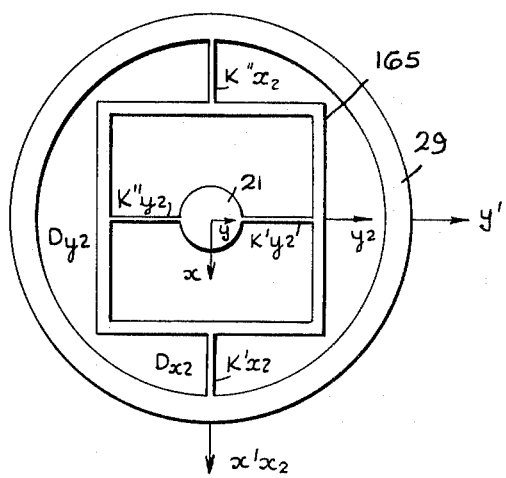

In FIG. 13a is shown a simplified diagram of the rotor 29, the shaft 21 and the gimbal 163 with coordinates adapted for ease of analysis and simplicity of the equations. Similarly, FIG. 13b is a simplified diagram of the rotor 29, shaft 21 and the gimbal 165 having coordinates which simplify the analysis and which result in simplified equations. The coordinates axes are defined as follows:

A right hand orthogonal set of coordinates, X, Y, Z are defined upon the supporting housing (not shown in FIGS. 13a and 13b).

The rotatable shaft 21 has affixed therein, a right hand orthogonal set of coordinates $x$, $y$, $z$ in which the coordinate $z$ coincides with the coordinate Z of the housing-fixed set of coordinates X, Y, Z. The $x$, $y$ coordinates rotate with the shaft 21 and define a plane which is at right angles to the driving shaft axis $z$.

A right handed orthogonal set or coordinates $x_1$, $y_1$, $z_1$ is defined in the gimbal 163 with the $x_1$ axis coinciding with the $x$ axis of the shaft 21, as shown particularly in FIG. 13a.

A right handed orthogonal set of coordinates $x_2$, $y_2$, $z_2$ is defined in the gimbal 165, as shown particularly in FIG. 13b, with the $y_2$ axis coaxial with the $y$ axis of the shaft 21.

A right handed orthogonal system of coordinates $x'$, $y'$, $z'$, as shown particularly in FIGS. 13a and 13b, is defined on the rotor 29 with the $x'$ axis coaxial with the $x_2$ axis. The $y'$ is coaxial with the $y_1$ axis.

The torsional spring constants of the springs connecting the shaft 21 and the gimbal 163 along the $x$, $x_1$ axes are designated $K_{x1}'$ and $K_{x1}''$. The spring constants of the springs connecting the shaft 21 and the gimbal 165 along the $y_2$, $y$ axes are designated $K_{y2}'$ and $K_{y2}''$. The spring constants of the springs connecting the gimbal 163 to the shaft 29 along the $y_1$ axis are designated $K_{y1}'$ and $K_{y1}''$. The spring constants of the springs connecting the gimbal 165 and the rotor 29 along the $x_2$ axis are designated $K_{x2}'$ and $K_{x2}''$.

In the following equations, $$K_{x1} = K_{x1}' + K_{x1}'' + K_{x2}' + K_{x2}''$$

$$K_y = K_{y1}' + K_{y1}'' + K_{y2}' + K_{y2}'' \quad (1)$$

The damping coefficient $D_{x1}$ is defined for gimbal 163 for its relative rotation about the $x_1$ axis. The damping coefficient $D_{y1}$ is defined for gimbal 163 for its rotation about the $y_1$ axis. Similarly, the damping coefficients $D_{x2}$ and $D_{y2}$ are defined for gimbal 165 for its relative rotation about the $x_2$ and the $y_2$ axes respectively. In the following equations, it is assumed that the damping coefficients are zero. The effect of a damping coefficient is to shorten the time constant of the device. Hence the value of the damping coefficient must be maintained small enough that it does not affect the operation of the device.

The principal moments of inertia for gimbal 163 are defined as $A_1$, $B_1$, $C_1$ about the $x_1$, $y_1$, $z_1$ axes respectively. The principal moments of inertia for gimbal 165 are defined as $B_2$, $A_2$, $C_2$ about the $x_2$, $y_2$, $z_2$ axes, respectively. Because of the symmetry of the gimbals 163 and 165 and of the rotor 29, the products of inertia are zero.

The principal moments of inertia for rotor 29 are defined as $A$, $B$, $C$ about the $x'$, $y'$, $z'$ axes respectively.

Figure 13C:
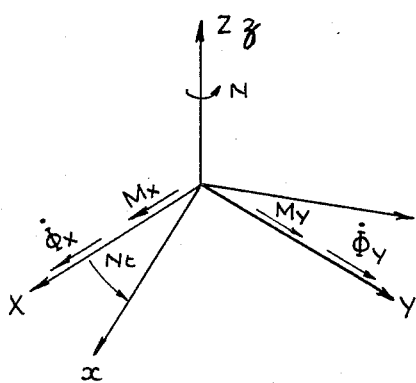
Figure 13D:
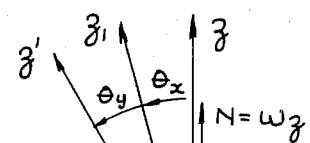

FIGS. 13c and d are diagrams showing the relationship between the housing or case-fixed coordinates X, Y, Z and the rotor-fixed coordinates $x$, $y$, $z$ for the purpose of explaining the resolution of angles, angular rates and torques which are applied about the case-fixed axes X, Y into the rotor-fixed axes coordinate system $x$, $y$, $z$. The angular velocity of the shaft is defined as "$N$." Angular rates applied to the housing or case perpendicular to the Z axis may be resolved into components $\phi_X$ and $\phi_Y$ about the case-fixed axes X and Y, respectively. The angular rates $\phi_X$ and $\phi_Y$ may then be resolved into angular rates about the shaft-fixed axes $x$, $y$, $z$. Similarly, torque acting on the gimbals (or rotor) from the housing or case about an axis perpendicular to the Z axis may be resolved into components $M_X$ and $M_Y$ about the X and Y axes, respectively. The $M_X$ and $M_Y$ components may be resolved about the shaft-fixed axes $x$ and $y$.

The spin axis $z'$ of the rotor 29 is, in general, not constrained to be coaxial with the axes $z$ and Z. The rotor 29 may be considered to be angularly displaced, relative to shaft 21, about the $x$ and $y$ axes. The angular displacements of the rotor 29, relative to the shaft 21, about the $x$ and $y$ axes of the shaft 21, are designated $\theta_x$ and $\theta_y$, respectively.

For the above definitions, the equations of motion of the rotor 29 relative to the shaft 21 are:

$(A+A_1)\ddot{\theta}_x + [K_x + N^2(C+C_1-B-B_1)]\theta_x + N(C-A-B)$
$\dot{\theta}_y = -(A+A_1)[\dot{\phi}_X \cos Nt + \dot{\phi}_Y \sin Nt] + N(C+C_1+A-B+A_1-B_1)[\phi_X \sin Nt - \phi_Y \cos Nt] + M_X \cos Nt + M_Y \sin Nt$ and (2)

$(B+A_2)\ddot{\theta}_y + [K_y + N^2(C+C_2-A-B_2)]\theta_y - N(C-A-B)$
$\dot{\theta}_x = +(B+A_2)[\dot{\phi}_X \sin Nt - \dot{\phi}_Y \cos Nt] + N(C+C_2+B-A+A_2-B_2)[\phi_X \cos Nt + \phi_Y \sin Nt] - M_X \sin Nt + M_Y \cos Nt$ It can be shown from these equations that if the torsional spring rates are adjusted, and the moments of inertia are adjusted, the rotor acts substantially as a free rotor, while eliminating rectification torques from the rotor caused by oscillatory inputs on the shaft at twice the spin frequency $N$. The general conditions for such adjustments are:

$$\Delta J = \frac{-\Delta K[J + (A+B-C)]}{K - N^2(A+B-C)} \quad (3)$$

for rectification suppression, and $$J = \frac{K}{N^2} - (A+B-C) + (A+B-C)$$
$$\left(1 + \frac{(\Delta K + N^2 \Delta J)^2}{N^4(A+B-C)^2}\right)^{1/2} \quad (4)$$

for perfect tuning; where:

$$J = \frac{1}{2}[(A_2 + B_2 - C_2) + (A_1 + B_1 - C_1)] \quad (5)$$

$$\Delta J = \frac{1}{2}[(A_2 + B_2 - C_2) - (A_1 + B_1 - C_1)] \quad (6)$$

$$K = \frac{1}{2}[K_x + K_y] \quad (7)$$

$$\Delta K = \frac{1}{2}[K_x - K_y] \quad (8)$$

and $N$ equals angular velocity of shaft 21 in radians/second.

For a practical instrument, $$\Delta K/K << 1 \text{ and } (A+B-C) >> J \quad (9)$$

Therefore equations (3) and (4), to a close approximation, reduce to:

$$\Delta J \cong \Delta K/N^2 \quad (10)$$

and $$J \cong K/N^2 \quad (11)$$

Rearranging equations (10) and (11) and substituting equations (5), (6), (7) and (8), $$(K_x - K_y) \cong N^2(A_2 + B_2 - C_2 - A_1 - B_1 + C_1) \quad (12)$$

for 2N rectification suppression, and $$(K_x + K_y) \cong N^2(A_1 + A_2 + B_1 + B_2 - C_1 - C_2) \quad (13)$$

Thus, for a given set of springs having composite spring constants $K_x$ and $K_y$ as defined in equation (1), it is possible to adjust the gimbal inertias by balance weights to achieve the desired conditions of both proper tuning and also zero 2N rectification.

Although the invention has been described with the driving shaft in the center and the rotor on the outside, it is to be understood that it is the intention to include within the spirit and scope of this invention the embodiment wherein the rotor is interior of the driving shaft.

Further, although only two kinds of torsion springs have been shown, it is intended that other kinds of torsion springs—for example—flexure pivots, torsion wires, V springs, and the like should be considered within the spirit and scope of the invention.

Similarly, although pickoffs and torquers for the rotor have been shown fixed upon the case or housing of the gyroscope, it is intended that pickoffs and torquers attached to the driving shaft should also be included within the spirit and scope of the invention.

Although particular kinds of pickoffs and torquers have been shown and described, other kinds, known to the art, may be substituted.

Although particular embodiments of closed gimbals have been shown and described, it is intended that other embodiments should be included within the spirit and scope of the invention.

It should be noted, if desired, the gimbal may be axially offset in the direction of the spin axis from the plane of attachment to the rotor.

Figure 22:
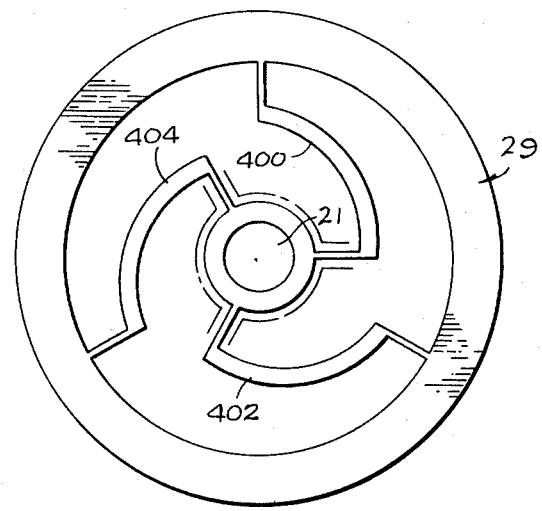

Attention is also requested to the more general configurations wherein, three or more gimbals, for example, gimbals 400, 402 and 404 in FIG. 22, are torsionally connected to the rotor and to the driving shaft. The set of torsion axes of the connections to the drive shaft and the set of torsion axes of the connection to the rotor each comprise, in a three gimbal system, three axes which are equiangularly spaced around the axes of spin of the shaft and rotor.

It is also within the scope of this invention that the angle between the axis of attachment to the drive shaft and the axis of attachment to each rotor, designated $\zeta$, need not be a right angle. In general, the preferred condition for tuning in such a gyroscope is that the sum of the spring constants of connection of the gimbal means to the shaft, plus the product of $\cos \zeta$ and the sum of the spring constants of connection of the gimbal means to the rotor is substantially equal to the square of the angular spin frequency times $(A_1 + B_1 + A_2 + B_2 - C_1 - C_2)$, wherein $A_1$, $B_1$ and $C_1$ are the principal moments of inertia of the first gimbal means, and $A_2$, $B_2$ and $C_2$ are the principal moments of inertia of the second gimbal means. The axes associated with $C_1$ and $C_2$ are substantially coincident with the spin axis of the shaft.

Although the invention has been described in detail above, it is not intended that the invention should be limited by that description, but only in accordance with the spirit and scope of the appended claims:

1. A gyroscope comprising:
a rotatable driving member having a first axis of rotation;
a rotatable rotor having a second axis of rotation;
first and second torsion means, attached to said rotatable driving member, and having their torsion axes substantially along third and fourth axes which are perpendicular to said first axis and to each other;
third and fourth torsion means, attached to said rotor, having their torsion axes substantially along fifth and sixth axes which are perpendicular to said second axis and to each other;
first gimbal means attached to said first and third torsion means with elastically restrained freedom of rotation relative to said driving means and said rotor, said third and fifth axes being perpendicular to each other; and
second gimbal means attached to said second and fourth torsion means, having elastically restrained freedom of rotation relative to said driving member and said rotor, said fourth and sixth axes being perpendicular to each other.

2. A device as recited in claim 1 in which:
each said gimbal means comprises first and second substantially identical gimbals, symmetrically positioned with respect to said driving member and said rotor;
each of said first and second torsion means comprises first and second torsion springs extending radially outward in opposite directions from said driving member; and
each of said third and fourth torsion means comprises first and second torsion springs extending radially inward in opposite directions from said rotor.

3. A device as recited in claim 2 in which:

the center of mass of said first gimbal means, including said first and second gimbals thereof, coincides with said first axis;
the center of mass of said second gimbal means, including said first and second gimbals thereof, coincides with said first axis;
the principal moments of inertia of said first gimbal means are designated $A_1$, $B_1$, and $C_3$, with the principal axis of inertia corresponding to $C_1$ coinciding with said first and second axes when said first and second axes are in their coaxial position;
the principal moments of inertia of said second gimbal means are designated $A_2$, $B_2$, and $C_2$, with the principal axis of inertia corresponding to $C_2$ coinciding with said first and second axes when said first and second axes are in their coaxial position; and
the sum of the spring constants of said first, second, third and fourth torsion means is substantially equal to the square of the angular spin frequency of said driving member and rotor, multiplied by the quantity $(A_1 + A_2 + B_1 + B_2 - C_1 - C_2)$.

4. A device as recited in claim 3 in which:
the spring constant of said first torsion means minus the spring constant of said second torsion means minus the spring constant of said third torsion means plus the spring constant of said fourth torsion means is substantially equal to the square of the angular spin frequency of said driving member and rotor, multiplied by the quantity $(A_2 + B_2 - C_2 - A_1 - B_1 + C_1)$.

5. A device as recited in claim 4 and further comprising:
means for sensing the misalignment between said first and second axes; and
means for controllably applying torque to said rotor.

6. A device as recited in claim 1 in which said rotor is pendulous.

7. The combination of claim 1 in which:
each said gimbal means comprises a closed gimbal;
each of said first and second torsion means comprises first and second springs on opposite sides of and equal distance from said first axis; and
each of said third and fourth torsion means comprises third and fourth springs on opposite sides of and equal distance from said second axis.

8. A device as recited in claim 7 in which:
the center of mass of said first gimbal means coincides with said first axis;
the center of mass of said second gimbal means coincides with said first axis;
the principal moments of inertia of said first gimbal means are designated $A_1$, $B_1$, and $C_1$, with the principal axis of inertia corresponding to $C_1$ coinciding with said first and second axes when said first and second axes are in their coaxial position;
the principal moments of inertia of said second gimbal means are designated $A_2$, $B_2$, and $C_3$, with the principal axis of inertia corresponding to $C_2$ coinciding with said first and second axes when said first and second axes are in their coaxial position; and
the sum of the spring constants of said first, second, third and fourth springs is substantially equal to the square of the angular spin frequency of said driving member and rotor, multiplied by the quantity $(A_1 + A_2 + B_1 + B_2 - C_1 - C_2)$.

9. A device as recited in claim 8 in which:
the spring constant of the first spring, minus the spring constant of the second spring, minus the spring constant of the third spring, plus the spring constant of the fourth spring is equal to the square of the angular spin frequency of said driving member and rotor, multiplied by the quantity $(A_2 - B_2 - C_2 - A_1 - B_1 + C_1)$.

10. The combination of claim 9 in which said torsion springs are cruciform springs.

11. The combination of claim 9 in which said springs are leaf springs.

12. A device as recited in claim 11 in which the medial planes of each pair of said leaf springs which are attached to said rotor form an acute angle with the medial planes of the pairs of said leaf springs attached to said shaft, and in which, in the undeflected condition of said springs, planes determined by the spin axis of said shaft and the torsion axes of said springs bisect said acute angles.

13. A device as recited in claim 12 in which said acute angles are substantially 84°.

14. In a gyroscope:
a rotatable drive shaft;
a rotor; and
suspension means coupled between said rotor and said shaft for substantially isolating the rotor from the shaft, said suspension means including at least two intermediate gimbals, each said gimbal being torsionally connected to said rotor for rotation about a first axis, each said first axis radially extending from said rotor, each said gimbal being torsionally connected to said drive shaft for rotation about a second axis oriented at an angle with the first axis, each said second axis radially extending from said shaft, each said first axis of each said gimbal being angularly offset with respect to at least one other said first axis and each said second axis of each said gimbal being angularly offset with respect to at least one other second axis.

15. A device as recited in claim 14 in which said torsion connections to said rotor are at right angles to each other and said torsion connections to said shaft are at right angles to each other.

16. A device as recited in claim 14 in which said torsion connections are cruciform springs.

17. A device as recited in claim 14 in which said torsion connections are leaf springs.

18. A device as recited in claim 17 in which said leaf springs are made from a dowel with its central portion formed into a leaf spring.

19. A device as claimed in claim 17 in which the medial planes of said leaf springs connected to said rotor form acute angles with the medial planes of said leaf springs attached to said shaft; and in which, in the absence of deflection of said springs, a plane determined by the spin axis of said shaft and the torsion axes of said springs bisects said acute angle.

20. A device as recited in claim 19 in which said acute angles are substantially 84°.

21. A device as recited in claim 14 in which the principal moments of inertia of said gimbals and spring constants of said torsion connections are adjusted to cause said rotor to have substantially the characteristics of a free rotor.

22. A device as recited in claim 14 in which said principal moments of inertia and said spring constants are adjusted to enhance the cancelling of steady torques on said rotor which are caused by oscillatory inputs on said drive shaft.

23. A device as recited in claim 14 in which said suspension means comprises a pair of substantially identical gimbals symetrically attached to said rotor and said drive shaft.

24. The device of claim 23 wherein each said gimbal means comprises cooperating fractional portions which are physically separated from one another.

25. The device of claim 24 wherein each said gimbal means said fractional portion extends over approximately a quarter of a circle, one end of such portion being connected to the rotor and the other end being connected to the shaft.

26. A device as recited in claim 14 in which said suspension means includes a pair of gimbals, said gimbals overlying with clearance for relative motion.

27. A device as recited in claim 14 in which said rotor is pendulous.

28. A device as recited in claim 14 and further comprising a second rotor; second drive shaft; and second suspension means attached to said second rotor and said second drive shaft to allow misalignment between the spin axes of said second rotor and said drive shaft.

29. A device as recited in claim 28 in which at least one of said rotors is pendulous.

30. The device of claim 14 wherein suspension means includes a plurality of intermediate gimbals coupled between said rotor and said shaft such that the rotor is substantially isolated from oscillatory motion of the shaft at frequencies within a frequency range including twice the spin frequency of the shaft.

31. The device of claim 14 wherein said suspension means includes two gimbals and the torsional axes of said gimbals are approximately at right angles to each other.

32. The device of claim 14 wherein said suspension means includes three gimbals, and the torsional axes of said gimbals are equiangularly spaced with respect to one another.

33. A device as recited in claim 14 in which said suspension means comprises three substantially identical gimbals, symmetrically attached to said rotor and said drive shaft.

34. In a gyroscope:
a driving shaft;
a rotor element; and
suspension means for connecting said rotor to said shaft such that said rotor has substantially the characteristics of a free tuned rotor; said suspension means comprising a pair of gimbal means for reducing the effects of vibratory forces in a frequency range including approximately twice the frequency of rotation of said shaft; each gimbal means being individually torsionally connected to said shaft and said rotor by spring means, the torsional axis of attachment between each of said gimbal means and said shaft being at approximately right angles to the torsional axis of attachment of the same gimbal means to said rotor, and each torsional axis of attachment of each said gimbal means being at approximately right angles to the corresponding torsional axis of attachment of the other said gimbal means.

35. The device of claim 34 wherein said suspension means includes means for connecting said rotor to said shaft such that said rotor is pendulous.

36. A device as recited in claim 34 in which:
the sum of the spring constants of connection of said gimbal means to said shaft and said gimbal means to said rotor is substantially equal to the square of the angular spin frequency times the quantity $(A_1 + B_1 + A_2 + B_2 - C_1 - C_2)$, wherein $A_1$, $B_1$, and $C_1$ are the principal moments of inertia of the first one of said gimbal means with the axis associated with $C_1$ substantially coincident with the spin axis of said shaft, and $A_2$, $B_2$, and $C_2$ are the principal moments of inertia of the second of said gimbal means with the principal axis associated with $C_2$ substantially coincident with the spin axis of said shaft.

37. A device as recited in claim 36 in which $(K_{x1} + K_{x2}) - (K_{y1} + K_{y2})$ is substantially equal to the square of the angular velocity of said shaft multiplied by the quantity $(A_2 + B_2 - C_2 - A_1 - B_1 + C_1)$, wherein $K_{x1}$, $K_{y1}$, are the spring constants of connection of said first gimbal to said shaft and said rotor, respectively and $K_{y2}$, $K_{x2}$ are the spring constants of connection of said second gimbal to said shaft and said rotor, respectively.

38. In combination:
a drive shaft;
a gyroscope rotor; and
a pair of gimbals each torsionally attached to said shaft and said rotor in a configuration allowing the spin axis of said rotor to be angularly displaced from the spin axis of said shaft about the axis of one of said torsional attachments with a first one of said gimbals angularly displacing with said rotor and a second one of said gimbals angularly displacing with said shaft; and wherein, when said torsional attachments are undeflected, the axis of torsional attachment of said first gimbal to said shaft is coaxial with the axis of torsional attachment of said second gimbal to said rotor; and in which the axis of torsional attachment of said second gimbal to said shaft is coaxial with the axis of torsional attachment of said first gimbal to said rotor.

39. In a gyroscope:
a driving shaft;
a rotor element; and suspension means for connecting said rotor to said shaft such that said rotor has substantially the characteristics of a free tuned rotor; said suspension means comprising three gimbals for reducing the effects of vibratory forces in a frequency range including approximately twice the frequency of rotation of said shaft, each said gimbal being individually torsionally connected to said shaft and said rotor element by spring means, the torsional axes of attachment of said three gimbals to said driving shaft being spaced around said shaft, the torsional axes of attachment of said three gimbals to said rotor element being spaced around said rotor element.

40. The device of claim 39 wherein said torsional axes of attachment of said three gimbals to said driving shaft are substantially equiangularly spaced around said driving shaft and said torsional axes of attachment of said three gimbals to said rotor element are substantially equiangularly spaced around said rotor element.

41. The device as recited in claim 39 wherein the torsion axis of attachment between each of said three gimbals and said shaft is at an approximately right angle to the torsional axis of attachment of the same gimbal to said rotor.

42. A gyroscope comprising:
a driving shaft having a first axis of rotation;
a rotor element having a second axis of rotation;
first, second and third torsion means, attached to said driving shaft and having their torsion axes substantially along third, fourth and fifth axes respectively which axes are all perpendicular to said first axis and which are equiangularly spaced with respect to one another around said first axis;
fourth, fifth and sixth torsion means attached to said rotor element and having their torsion axes substantially along sixth, seventh and eighth axes respectively which axes are all perpendicular to said second axis and which are equiangularly spaced with respect to one another around said second axis;
a first gimbal attached to said first and fourth torsion means having elastically restrained freedom of rotation relative to said driving shaft and said rotor element;
a second gimbal attached to said second and fifth torsion means having elastically restrained freedom of movement relative to said driving shaft and said rotor element; and
a third gimbal attached to said third and sixth torsion means having elastically restrained freedom of movement relative to said driving shaft and said rotor element.

43. A device as recited in claim 42 and further comprising:
means for sensing the misalignment between said first and second axes; and
means for controllably apply torque to said rotor.

44. The device as recited in claim 42 wherein said third and sixth axes are perpendicular with respect to each other, said fourth and seventh axes are perpendicular with respect to each other, and said fifth and eighth axes are perpendicular with respect to each other.

45. A device as recited in claim 42 in which the principal moments of inertia of said first, second and third gimbals and spring constants of said first, second, third, fourth, fifth and sixth torsion means are adjusted to cause said rotor element to have substantially the characteristics of a free rotor.

46. A device as recited in claim 42 in which said principal moments of inertia and in which said spring constants are further adjusted to enhance the cancelling of steady torques on said rotor element which are caused by oscillatory inputs on said driving shaft.

* * * * *

UNITED STATES PATENT OFFICE
CERTIFICATE OF CORRECTION

Patent No. 3,678,764      Dated July 25, 1972

Inventor(s) HAROLD F. ERDLEY, ET. AL.      PAGE 1

It is certified that error appears in the above-identified patent and that said Letters Patent are hereby corrected as shown below:

Col. 7, line 45, Equation (1) should read:

$$K_x = K_{x1}' + K_{x1}'' + K_{x2}' + K_{x2}''$$
$$K_y = K_{y1}' + K_{y1}'' + K_{y2}' + K_{y2}''$$

Col. 7, line 76 should read:

-- $\dot{\phi}_X$ and $\dot{\phi}_Y$ about the case-fixed axes X and Y, respectively. --

Col. 7, line 77 should read:

-- The angular rates $\dot{\phi}_X$ and $\dot{\phi}_Y$ may then be resolved into angular --

Col. 8, lines 11 through 20, Equation (2) should read:

$$(A + A_1)\ddot{\theta}_x + [K_x + N^2(C + C_1 - B - B_1)]\theta_x + N(C - A - B)\dot{\theta}_y = -(A + A_1)[\ddot{\phi}_X \cos Nt + \ddot{\phi}_Y \sin Nt] + + N(C + C_1 + A - B + A_1 - B_2)[\dot{\phi}_X \sin Nt - \dot{\phi}_Y \cos Nt] + M_X \cos Nt + M_Y \sin Nt$$

and $$(B + A_2)\ddot{\theta}_y + [K_y + N^2(C + C_2 - A - B_2)]\theta_y - N(C - A - B)\dot{\theta}_x = +(B + A_2)[\ddot{\phi}_X \sin Nt - \ddot{\phi}_Y \cos Nt] + + N(C + C_2 + B - A + A_2 - B_2)[\dot{\phi}_X \cos Nt + \dot{\phi}_Y \sin Nt] - M_X \sin Nt + M_Y \cos Nt$$

UNITED STATES PATENT OFFICE
CERTIFICATE OF CORRECTION

Patent No. 3,678,764  Dated July 25, 1972

Inventor(s) HAROLD F. ERDLEY, ET. AL.  PAGE 2

It is certified that error appears in the above-identified patent and that said Letters Patent are hereby corrected as shown below:

Claim 3, column 10, line 8, "$C_3$" should read -- $C_1$ -- .

Claim 8, column 10, line 55, "$C_3$" should read -- $C_2$ -- .

Signed and sealed this 20th day of November 1973.

(SEAL)
Attest:

EDWARD M. FLETCHER, JR.
Attesting Officer

RENE D. TEGTMEYER
Acting Commissioner of Patents